Aug. 12, 1952     C. L. BARKER     2,606,717
THERMOSTATIC FLUID MIXING DEVICE
Filed June 11, 1949     3 Sheets-Sheet 3

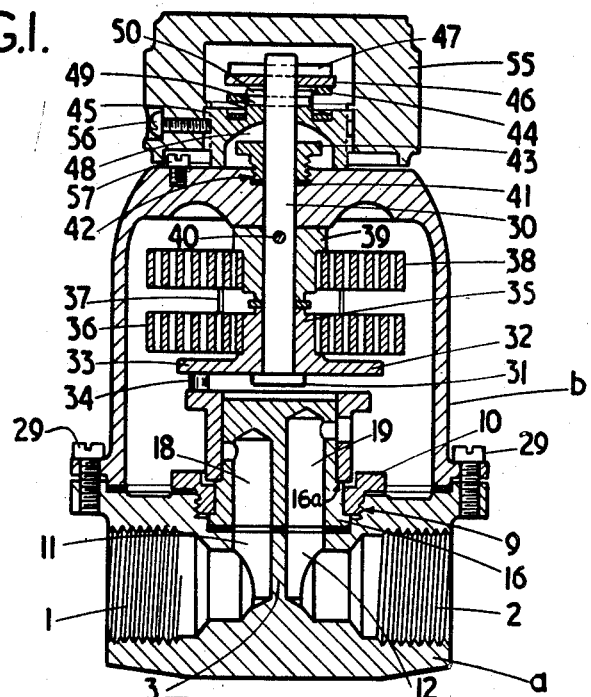

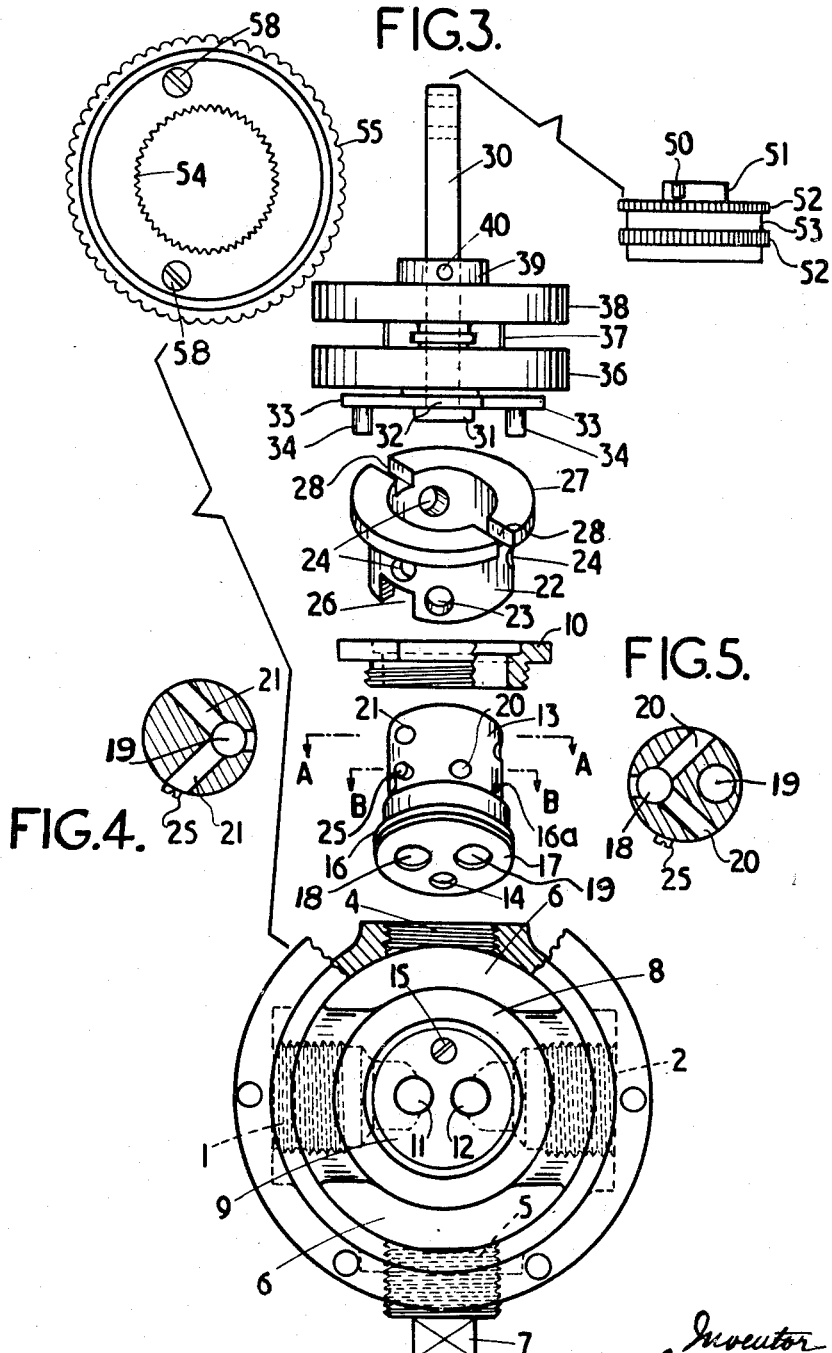

Inventor:
Clifford L. Barker
By Nathaniel Frucht
atty.

Patented Aug. 12, 1952

2,606,717

UNITED STATES PATENT OFFICE 2,606,717

THERMOSTATIC FLUID MIXING DEVICE

Clifford L. Barker, Cheltenham, England, assignor to Walker Crosweller & Company Limited, Cheltenham, England Application June 11, 1949, Serial No. 98,565
In Great Britain May 21, 1948

12 Claims. (Cl. 236—12)

This invention has reference to thermostatically controlled devices for mixing two streams of fluid at different temperatures to provide a fluid mixture of a predetermined and controlled temperature; for example, the devices may be used for mixing cold water with hot water or steam.

Devices of this kind are well known and they comprise a casing which houses a valve through which the fluid streams are fed to the interior of the casing, and a thermally sensitive unit housed within the casing for automatically controlling the valve so that the correct proportions of hot and cold fluids are allowed to enter the casing and so that, should the volume or temperature of either fluid change for any reason, the valve is adjusted to compensate this variation by altering the volume of the other fluid which is allowed to pass through the valve.

The principal object of the present invention is to provide a new or improved construction of mixing device of this kind so that a more effective and sensitive temperature control of the fluid mixture is obtained.

Another object of the invention is to provide a fluid mixing device which is simpler in design and less expensive to manufacture.

Another object of the invention is to prevent excessive or undue distortions of the valve under the action of widely differing temperatures of the fluid streams.

Another object of the invention is to prevent or minimise binding of the valve upon its seating under the action of the heat sensitive unit.

Still another object of the invention is to enable the thermally sensitive unit to be uncoupled from, and recoupled to, the valve quickly and easily so that the device may be dismantled and serviced without trouble, as and when desired.

In the known devices of the kind referred to above, it is quite common practice to provide, externally of the casing, a handle or similar manually operated means for adjusting the initial setting of the thermally sensitive unit so that the temperature of the fluid mixture may be changed to suit requirements; the range of adjustment thus obtained is limited by the permissible movement that may be imparted to the handle and it frequently happens that this range of movement is insufficient; therefore, it is known to assemble the handle in such a manner that it can be dismantled from the device and reassembled in a different relationship to the thermally sensitive unit. However, as it is advisable to incorporate in the handle mounting a spring for imparting an axial force to a spindle which carries the thermally sensitive unit and through which adjustment is transmitted to the said unit from the handle, this dismantling and reassembly of the handle is difficult and still another object of the invention is to provide a simple handle assembly means which enables the temperature adjusting handle to be dismantled and reassembled in a new position relatively to the thermally sensitive unit, quickly and easily.

It is further possible that undue torsional forces may be imparted to the thermally sensitive unit by handle adjustment and yet another object of the invention is to prevent the imposition of excessive torsional forces to the said unit.

These and other objects of the invention will be apparent from the specific embodiment of the invention illustrated in the accompanying drawings, in which:

Figure 1 is a sectional elevation of a device for mixing two fluid streams.

Figure 2 is an elevation, partly in section, taken at right angles to Figure 1.

Figure 3 is an exploded view showing certain parts of the device in greater detail.

Figure 4 is a section along the line A—A, Figure 3.

Figure 5 is a section along the line B—B, Figure 3.

Figure 6:
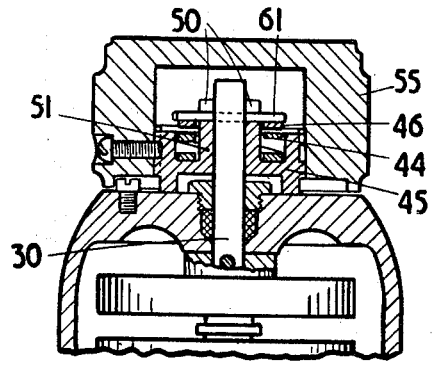
Figures 6-8 are sectional elevations showing alternative means for imparting the axially directed resilient force to the spider-carrying spindle.

As shown in Figures 1–3, the casing of the device comprises a base $a$ having two co-axial fluid inlets 1 and 2 arranged diametrically of the said base, the inner or adjacent ends of the said inlets being separated by a partition 3. The base is also formed with two diametrically opposed outlets 4 and 5 (see Figure 3) which opens into a well 6 formed within the base, one of the said outlets being closed by a plug 7. The two inlets and the two outlets are tapped so that a fluid supply pipe (not shown) may be connected into each inlet and a mixture delivery pipe may be connected to the outlet which is not closed by the plug 7.

The base is formed, centrally thereof, with a boss 8 into opposite sides of which the inlets 1 and 2 extend. The crown of the base is formed in a circular depression 9 which is tapped to receive an annular clamping nut 10, and on opposite sides of the partition 3, passages 11 and 12 extend upwardly from the inner ends of the inlets 1 and 2 respectively to the floor of the depression.

The lower end of a one piece, cylindrical spigot 13 seats within the depression 9 and is formed, in its lower face, with a recess 14 (see Figure 3) which sockets on to the head of a screw 15 inserted into the floor of the depression, whereby relative rotation of the spigot and boss is prevented and the spigot is correctly located relatively to the boss.

To enable the spigot to be rigidly secured to the boss, the lower end of the said spigot is formed with a peripheral shoulder 16, upon which the clamping nut 10 seats when secured into the depression 9. Leakage of fluid between the boss and spigot is prevented by a resilient disc 17 which is inserted between the said boss and spigot. A second and narrower shoulder 16a is formed around the spigot intermediate its crown and lower end.

Two fluid passages 18 and 19, which are of the same diameter as and which are located co-axially with, the passages 11 and 12, are formed longitudinally of the spigot and open through the lower end face of the latter so that they communicate, through the said boss passages, with the inlets 1 and 2 respectively. The passage 18 is shorter than the passage 19 so that its upper end is located at a greater distance from the spigot crown. As shown most clearly in Figures 4 and 5, the upper end of the passage 18 communicates with a system of three fluid outlet passages 20 whereas the upper end of the passage 19 communicates with a similar system of outlet passages 21. All the passages 20 and 21 open at the periphery of the spigot, and each passage system is so arranged that their open ends are displaced at 120° apart around the said periphery. However, the passages 20 are located in a plane which is further from the spigot crown than the plane containing the passages 21 and the open ends of the two systems of passages are staggered relatively to one another, that is to say, that the open end of each passage 20 is located mid-way between the open ends of two passages 21.

Closely surrounding the spigot 13 is a ported sleeve valve 22 having, in its wall, two systems of ports 23 and 24 which are spaced apart, lengthwise of the sleeve, by the same distance as the two systems of fluid outlets 20 and 21 are spaced apart lengthwise of the spigot; hence, when the sleeve valve is in position with its lower edge seated upon the spigot shoulder 16a, the ports 23 and 24 are located in the planes of the fluid outlets 20 and 21 respectively. Whilst the ports of each port system are spaced apart around the sleeve by 120°, the ports 23 are not disposed mid-way between the ports 24; instead they are so arranged that when the ports 24 are completely in register with the outlet ends of the passages 21, no part of the ports 23 overlaps the outlet ends of the passages 20, whereas when the ports 23 are completely in register with the outlet ends of passages 20, the ports 24 are located wholly to one side of the corresponding ports 21. Consequently, by rotation of the sleeve valve around the spigot, either the outlet ends of the passages 20 or 21 can be fully opened or the ends of both systems of passages can be partially opened; the ends of one system of passages being opened as the ends of the other system of passages are being closed. In this manner, the proportions of fluid streams fed into the inlets 1 and 2 and flowing through the passages 11 and 12, 18 and 19, 20 and 21, and ports 23 and 24 can be varied by rotation of the sleeve valve.

A radially extending pin 25 is provided on the spigot 13 and this pin enters an aperture 26 in the sleeve valve, thereby limiting the rotational movement of the latter about the spigot to such an extent that the valve can be moved only from one extreme position wherein one system of fluid outlets are fully opened to its other extreme position wherein the second system of fluid outlets are fully opened.

The upper end of the sleeve valve 22 is formed with a radially extending flange 27 having a radial slot 28 formed therein at each of two diametrically opposed positions.

A dome-like cover is detachably assembled by bolts 29 to the periphery of the base a to complete the casing of the device. A spindle 30 is journalled in the crown of the cover and is arranged co-axially with the spigot 13. The spindle extends from the inside to the outside of the cover and its inner end is formed with a peripheral flange 31 upon which seats a spider 32 which is rotatably carried by its centre, upon the said spindle. The spider comprises two aligned arms 33 from the free end of each of which a pin 34 depends into engagement with a corresponding slot 28. The spider also comprises a central hub 35 around which there is located a coil 36 of bi-metallic strip. The inner end or convolution of the coil 36 is secured to the hub 35 whereas its outer end or convolution is rigidly secured to a metal strip 37 which is also rigidly secured to the outer end or convolution of a second identical coil 38 located around the spindle between the coil 36 and the crown of the cover b. The inner end or convolution of the coil 38 is secured to a bush 39 which is carried by the spindle 30 and is secured to the latter by a pin 40. The thermally sensitive unit is thus carried solely by the spindle 30 from the dome of the cover b independently of the valve 13, 22; consequently, when the assembly bolts 29 are removed, the cover and thermally sensitive unit may be dismantled from the base a and the valve so that either the unit or the valve may be serviced without trouble; when reassembling the device it is only necessary to ensure that the sleeve 22 is positioned to enable the pins 34 to reengage the slots 28.

To ensure that the coils 36 and 38 cannot be damaged due to excessive rotation of the spindle 30, the pin 40 is of such predetermined strength that it shears before any excessive torsional force is imparted to the said coils.

The leakage of fluid from the interior of the cover (which, together with the well 6, forms the mixing chamber for the fluids flowing through the ports 23 and 24) is prevented partially by the abutment of the bush 39 with the inner surface of the cover b, and partly by a resilient washer 41 which is disposed around the spindle in the bottom of a cover depression 42, and which is compressed by a gland nut 43 screwed into the said depression.

The bush 39 is held in abutment with the cover, and the spindle 30, together with the spider 32 and coils 36, 38 are prevented from axial displacement within the device, by an axial force which is imparted to the spindle by a coiled compression spring 44. This spring is disposed around the external end of the spindle between an annulus 45 and a washer 46, the annulus being seated on the crown of the cover and the washer being retained upon the spindle by a pin 47 which extends through the spindle end.

The annulus is formed on its underside with a recess 48 in which the gland nut 43 is accommodated and is held against rotation relatively to the spindle by a pin 49 which extends through the said spindle and enters diametrically opposed slots 50 in the upper end of a hub 51 extending from the upper face of the annulus.

The external periphery of the annulus is formed with a system of serrations 52 and with a circumferential groove 53 (see Figure 3). The serrations mesh with complementary serrations 54 formed around the internal periphery of an inverted cup-like handle 55 which is socketed on to the said annulus to permit of manual rotary adjustment being imparted to the annulus, spindle and coil assembly, whereby the initial setting of the sleeve valve 22 upon the spigot 13 may be adjusted for varying the controlled temperature of the fluid mixture.

Inadvertent removal of the handle from the annulus is prevented by a screw 56 which extends radially through the handle into engagement with the groove 53. Also the rotational movement of the handle relatively to the cover, and, consequently, the adjustment that may be imparted to the sleeve valve, is limited by providing a screw 57 in the crown of the cover b, and the underside of the handle with two spaced screws 58 which are arranged on opposite sides of, and in the same arcuate path concentric to the spindle 30, as the cover screw 57.

Figure 9:
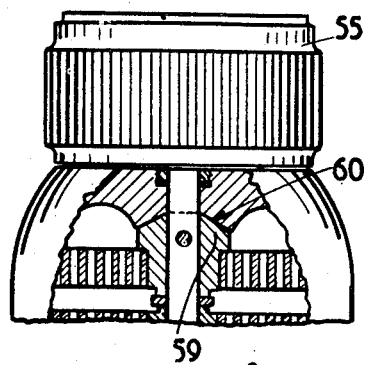
Figure 9 is an elevation, partly in section, of another modified detail of construction.

The endwise force imparted to the spindle 30 by the spring 44, causes the bush 39 to bear upon the internal surface of the cover b so that rotation of the spider 32 under the control of the thermally sensitive unit formed by the coils 36 and 38, does not impart any rotation to the said spindle. If desired, as shown in Figure 9, to enhance the friction created between the bush 39 and the said cover, the former may be provided with a conical projection 59 which is spring-retained in face-to-face contact with a similarly shaped recess 60 in the internal surface of the cover.

Figure 7:
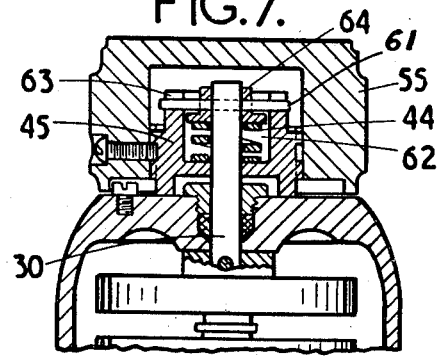
Figure 8:
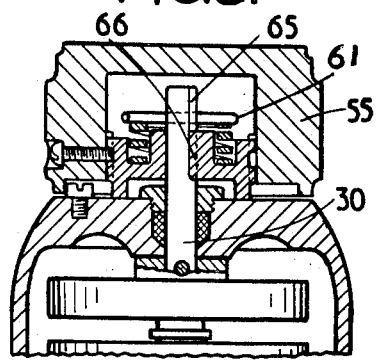

Also, instead of fixing the annulus 45 to the spindle 30 in the manner shown in Figure 1, this fixing may be effected as shown in any of Figures 6–8.

The annulus 45 shown in Figure 6 has a hub 51 which extends through and beyond the spring 44; consequently, a single pin 61 extending through the spindle and entering the recesses 50, serves for securing the annulus, for retaining the washer 46 around the hub 51, and for retaining the spring in compression.

In the arrangement shown in Figure 7, the annulus 45 is not provided with a central hub; it is however much deeper than the annulus of Figure 6 and a spring accommodating pocket 62 is formed in its upper surface. Two diametrically opposed slots 63 are formed in the rim of the pocket and receive the opposite ends of a fixing pin 61 which extends through the spindle and also through a bush 64 which is provided on the spindle in place of the washer 46 and serves as an abutment for the spring 44.

Instead of arranging for a pin 49 (Figure 1) or 61 (Figures 6 and 7) to engage recesses in the annulus for preventing rotation of the latter upon the spindle 30, the spindle may be formed with a key-way 65 (see Figure 8) which is engaged by a key 66 formed internally of the annulus hub 51. With such an arrangement, the pin 61 merely retains the spring 44 in compression and transmits the force exerted by the spring to the spindle 30.

When the mixing device is in operation, cold water is fed into one of the inlets 1 or 2 and hot water or steam is fed into the other inlet. The two streams of fluid flow from the said inlets to and through the spigot passages 18 and 19, the outlet passages 20 and 21 and sleeve valve ports 23 and 24, into the mixing chamber formed by the interior of the cover b and the well 6. The mixture is then discharged through the outlet 4 or 5 which is not closed by the plug 7.

The temperature of the mixture is predetermined by the initial manual setting of the sleeve valve 22 under the control of the handle 55. Should the mixture vary from the predetermined temperature, the coils 36 and 38 of the thermally sensitive unit impart a rotary movement to the sleeve valve to adjust the degrees of overlap of the two ports 23 and 24 with the outlet ends of the passage systems 20 and 21, reducing the proportion of the hot water or steam if the temperature has increased or the proportion of the cold water if the temperature has decreased.

The location of the passage systems 20, 21 and of the valve ports 23 and 24 at different positions lengthwise of the spigot 13, and the staggered relationship of the outlet ends of the said passages around the spigot periphery, minimises the tendency for the spigot or sleeve valve to be distorted by varying fluid temperatures, and also minimises the expansions of the said spigot and valve by the hot water or steam. Consequently, a minimum clearance need be provided between the spigot and valve so that uncontrolled seepage of fluid into the mixing chamber is reduced to a negligible amount. Secondly, since the drive from the coils to the sleeve valve, is imparted to the latter at equidistant intervals around the said valve by the engagement of the spider pins 34 in the valve recesses 28, there is no tendency for the valve to bind upon the spigot and therefore the control of the temperature of the fluid mixture is sensitive and accurate.

A further advantage resulting from the invention is that the base a is of such a simple design that it may be produced by die casting or press operations with the result that the production of faulty bases and the number of finishing operations necessary to render the cast or pressed base suitable for use, are reduced to a minimum.

Since the range of initial settings that may be imparted to the valve by the manual adjustment of the handle 55, is restricted by the screws 57 and 58 in the cover and handle respectively, then, if a desired mixture temperature does not fall within this range, the handle is dismantled from the annulus 45 after disengaging the screw 56 from the groove 53, and is reassembled in a different relationship relatively to the said annulus. Since this procedure does not necessitate any disturbance of the compression spring 44, it is easily and quickly effected.

Whilst I have illustrated and described one embodiment of my invention, it will be understood that the said invention may be otherwise embodied or practiced within the scope of the following claims; for example, instead of securing the spigot 13 within a depression in the base a by means of a nut 10, the spigot may be flanged and held upon the base of the casing by screws; also, instead of providing the sleeve-engaging pins 34 upon the spider 33 for engagement in slots 28 in the ported sleeve valve, the pins may be arranged to project upwardly from the valve into engagement with slots in the arms of the spider.

Having described my invention, what I claim and desire to secure by Letters Patent is:

1. A thermostatic fluid mixing device comprising a casing having a plurality of fluid inlets and a fluid mixture outlet, a valve housed within the casing for controlling the proportions of fluids flowing from the said inlets to the interior of the casing, a thermally sensitive unit housed within the casing for controlling the valve so as to vary the said fluid proportions upon variation of the temperature within the casing, a spindle journalled in the casing and extending from the inside to the outside thereof, the spindle being connected to the said unit and to an annulus located around the spindle externally of the casing, a stressed spring urging the annulus towards the casing and the spindle outwardly of the casing, and a handle detachably connected to the said annulus.

2. A thermostatic fluid mixing device comprising a casing having a plurality of fluid inlets and a fluid mixture outlet, a valve housed within the casing for controlling the proportions of fluids flowing from said inlets to the interior of the casing, a thermally sensitive unit housed within the casing for controlling the valve so as to vary the said fluid proportions upon variation of temperature within the casing, a spindle journalled within the casing and extending from the inside to the outside thereof, a shear pin connecting the said spindle to the said thermally sensitive unit, and a handle detachably assembled to the said spindle externally of the casing.

3. A thermostatic fluid mixing device comprising a casing having a plurality of fluid inlets and a fluid mixture outlet, a fluid-flow control valve and a thermally sensitive unit housed within the casing, the said unit including at least one coil of bimetal strip which is connected at one end to the valve and at the other end to a spindle journalled in and projecting to the outside of the casing, an annulus located around and assembled to the spindle externally of the casing, a pin extending through and projecting from the spindle outwardly of said annulus, a coiled compression spring disposed around the spindle between the annulus and the pin, and a handle detachably assembled to the said annulus.

4. A thermostatic fluid mixing device comprising a casing having a plurality of fluid inlets and a fluid mixture outlet, a fluid-flow control valve and a thermally sensitive unit housed within the casing, the said unit including two bimetal coils arranged parallel to one another around a spindle journalled in and extending to the outside of the casing, a spider rotatably mounted upon the said spindle being coupled to the said valve and secured to the inner end of one of the said coils, a bush disposed around the spindle and connected to the latter by a shear pin, being secured to the inner end of the second coil, a strap connecting the outer ends of the coils together, an annulus disposed around and connected to the spindle externally of the casing, a spring disposed around the spindle between the annulus and a projection from the spindle and urging the annulus towards the casing and the spindle outwardly of the casing, and a handle detachably assembled to the said annulus.

5. A thermostatic fluid mixing device comprising a casing having a plurality of fluid inlets and a fluid mixture outlet, a valve housed within the casing and arranged to proportion the streams of fluid flowing from said inlets into the said casing, a thermally sensitive unit housed within the casing and connected between the said valve and a spindle which is journalled in and extends to the outside of the casing, for adjusting the valve upon temperature variations within the casing, an annulus disposed around the spindle externally of the casing and having diametrically opposed recesses in its upper side, a pin extending through the spindle into engagement with the said recesses, a second pin carried in and projecting radially from the spindle outwardly of the annulus, a coiled compression spring disposed around the spindle between the annulus and the said second pin, and a handle socketed on and detachably secured to the said annulus.

6. A thermostatic fluid mixing device comprising a casing having a plurality of fluid inlets and a fluid mixture outlet, a valve housed within the casing and arranged to proportion the streams of fluid flowing from said inlets into the said casing, a thermally sensitive unit housed within the casing and connected between the said valve and a spindle which is journalled in and extends to the outside of the casing, for adjusting the valve upon temperature variations within the casing, an externally serrated annulus disposed around the spindle externally of the casing, a boss formed on and concentrically of the side of the annulus remote from the casing and having two diametrically opposed recesses in its edge, a pin carried in said spindle and engaging the said recesses, a second pin carried in said spindle outwardly of the first pin, a coiled compression spring disposed around the spindle between the said annulus and the said second pin, an inverted cup-shaped handle having a serrated internal periphery socketing on to and closely fitting around the said annulus, and means for detachably securing the said handle to the said annulus.

7. A thermostatic fluid mixing device comprising a casing having a plurality of fluid inlets and a fluid mixture outlet, a valve housed within the casing and arranged to proportion the streams of fluid flowing from said inlets into the said casing, a thermally sensitive unit housed within the casing and connected between the said valve and a spindle which is journalled in and extends to the outside of the casing, for adjusting the valve upon temperature variations within the casing, an externally serrated annulus disposed around the spindle externally of the casing, a boss formed on and concentrically of the side of the annulus remote from the casing and having two diametrically opposed recesses in its edge, a pin carried in said spindle and extending through said recesses radially outwards of the said boss, a coiled compression spring disposed around the boss between the annulus and the ends of the said pin, an inverted cup-shaped handle having a serrated internal periphery socketing onto and closely fitting around the said annulus, and means for detachably securing the said handle to the said annulus.

8. A thermostatic fluid mixing device comprising a casing having a plurality of fluid inlets and a fluid mixture outlet, a valve housed within the casing and arranged to proportion the streams of fluid flowing from said inlets into the said casing, a thermally sensitive unit housed within the casing and connected between the said valve and a spindle which is journalled in and extends to the outside of the casing, for adjusting the valve upon temperature variations within the casing, an externally serrated annulus disposed around the spindle externally of the casing, said annulus having a pocket in its side remote from the casing, two diametrically opposed recesses in its upper edge, a pin carried in the said spindle with its ends engaging the said recesses, a coiled compression spring disposed around the spindle with the annulus pocket, an inverted cup-shaped handle having a serrated internal periphery socketed on to and fitting closely around the annulus, and means for detachably securing the said handle to the said annulus.

9. A thermostatic fluid mixing device comprising a casing having a plurality of fluid inlets and a fluid mixture outlet, a valve housed within the casing and arranged to proportion the streams of fluid flowing from said inlets into the said casing, a thermally sensitive unit housed within the casing and connected between the said valve and a spindle which is journalled in and extends to the outside of the casing, for adjusting the valve upon temperature variations within the casing, the said spindle having a keyway extending longitudinally thereof from its outer end, an externally serrated annulus disposed around the spindle externally of the casing and having a key which slidably engages the said keyway, a centrally disposed hub on the side of the annulus remote from the casing, a pin carried in and projecting radially of the spindle, a coil compression spring disposed around the hub between the pin and the annulus, an internally serrated cup-shaped handle socketed onto and fitting closely around the said annulus, and means for detachably securing the said handle to the annulus.

10. A thermostatic fluid mixing device comprising an internally dished base and a domed cover assembled to the dished side of the said base, a boss formed internally and concentrically of the base, two radial fluid inlet passages extending from the periphery of the base into the said boss, each radial passage opening directly into a complementary passage extending lengthwise of and opening to the end of the boss adjacent to cover a one-piece cylindrical spigot, assembled to the said boss end, having two inlet passages extending lengthwise thereof and opening to the spigot end adjacent the boss, each spigot passage registering with and being of the same diameter as a complementary boss passage, additional passages in the spigot extending from each of said inlet passages to the spigot periphery, a sleeve rotatably mounted around the said spigot and having ports in its side wall for controlling the fluid discharge ends of the said additional spigot passages, a spindle rotatably mounted in the domed cover concentrically to, but terminating short of, the spigot, a thermally sensitive unit carried by the said spindle, means incorporated in said unit engaging said ported sleeve for turning the latter upon the spigot under the control of fluid temperature variations within the cover, and the base having at least one fluid outlet which opens into a clearance between the boss and the wall of the base.

11. A thermostatic fluid mixing device comprising a dished base and an internally domed cover assembled to the dished side of the said base, a boss formed internally and concentrically of the base, two radial fluid inlet passages extending from the periphery of the base into the said boss, each radial passage opening directly into a complementary passage extending lengthwise of and opening to the end of the boss adjacent the cover, a one-piece cylindrical spigot, the said spigot having a recess in its seating face and said recess engaging a projection from the boss to locate the spigot relatively to the boss, an annular nut surrounding the spigot, engaging a peripheral shoulder on the spigot, and being screwed into a tapped recess in the boss, the said spigot also having two inlet passages extending longitudinally thereof and opening to the spigot end adjacent the boss, each spigot passage registering with and being of the same diameter as a complementary boss passage, a plurality of additional passages in the spigot extending from each longitudinal spigot passage to the periphery of the spigot, said additional passages being arranged in planes at right angles to the axes of the longitudinal passages, a sleeve rotatably mounted around the spigot and having in its side wall the same number of ports as there are additional passages in the spigot for controlling the fluid discharge ends of the said additional passages, a spindle rotatably mounted in the domed cover concentrically to, but terminating short of, the spigot, a thermally sensitive unit carried by the said spindle, means incorporated in said unit engaging said ported sleeve for turning the latter upon the spigot under the control of fluid temperature variations within the cover, and the base having two opposed fluid outlets which open into clearances between the boss and the wall of the base, one of said outlets being closed by a removable plug.

12. A thermostatic fluid mixing device comprising a dished base and an internally domed cover assembled to the dished side of the base, a boss formed internally and concentrically of the base, two radial fluid inlet passages extending from the periphery of the base into the said boss, each radial passage opening directly into a complementary passage extending lengthwise of and opening to the end of the boss adjacent the cover, a one-piece cylindrical spigot, assembled to the said boss end, having two inlet passages extending longitudinally thereof and opening to the spigot end adjacent the boss, each spigot passage registering with and being of the same diameter as a complementary boss passage, the spigot having between each of its longitudinal passages and its periphery, three additional passages, the additional passages of one longitudinal passage being arranged in a common plane which is located at a different position, lengthwise of the spigot, from a plane containing the additional passages of the other longitudinal passage and the fluid discharge ends of the additional passages in the one plane being staggered relatively to the corresponding ends of the passages in the other plane, a sleeve rotatably mounted around the spigot and having in its side wall the same number of ports as there are additional passages in the spigot for controlling the fluid discharge ends of the said passages, a spindle rotatably mounted in the domed cover concentrically to, but terminating short of, the spigot, a thermally sensitive unit carried by the said spindle, means incorporated in said unit engaging said ported sleeve for turning the latter upon the spigot under the control of fluid temperature variations within the cover, and the base having at least one fluid outlet which opens into a clearance between the boss and the wall of the base.

CLIFFORD L. BARKER.

REFERENCES CITED

The following references are of record in the file of this patent:

UNITED STATES PATENTS

| Number | Name | Date |
| --- | --- | --- |
| 1,957,276 | Leonard | May 1, 1934 |
| 2,180,362 | Leonard | Nov. 21, 1939 |